United States Patent [19]

Marmur et al.

[11] Patent Number: 5,246,330
[45] Date of Patent: Sep. 21, 1993

[54] APPARATUS FOR LOADING AND UNLOADING OF TWO SEPARATE CONTAINERS UPON A VEHICULAR BODY

[75] Inventors: Lazar Marmur, Plainsboro; Edward Kaplun, Trenton, both of N.J.

[73] Assignee: Automated Waste Equipment Co., Inc., Trenton, N.J.

[21] Appl. No.: 876,929

[22] Filed: May 1, 1992

[51] Int. Cl.$^5$ .................. B65G 67/02; B60P 1/04
[52] U.S. Cl. ...................... 414/494; 280/789; 414/477; 414/478; 414/480; 414/500; 414/538
[58] Field of Search .................. 414/477–480, 414/482, 491, 494, 500, 501, 506, 538, 679; 280/418.1, 789

[56] References Cited

U.S. PATENT DOCUMENTS

| | | | |
|---|---|---|---|
| 2,699,735 | 1/1955 | Williams | 414/341 X |
| 2,741,383 | 4/1956 | Leckert | 414/491 X |
| 2,831,588 | 4/1958 | Seed | 414/341 |
| 3,001,825 | 9/1961 | Rouse | 414/477 X |
| 3,130,847 | 4/1964 | Dempster et al. | 414/491 |
| 3,138,276 | 6/1964 | Allen et al. | 414/491 |
| 4,092,755 | 6/1978 | Hughes | 414/494 X |
| 4,133,439 | 1/1979 | Goranson | 414/494 |
| 4,410,207 | 10/1983 | Scharf | 414/480 X |
| 4,514,131 | 4/1985 | Godwin, Sr. | 414/480 |
| 4,529,349 | 7/1985 | Lutz | 414/478 |
| 4,599,040 | 7/1986 | Rasmussen | 414/467 X |
| 4,645,405 | 2/1987 | Cambiano | 414/480 X |
| 4,702,662 | 10/1987 | Marlett | 414/477 |
| 4,704,063 | 11/1987 | Updike, Jr. et al. | 414/679 X |
| 4,836,735 | 6/1989 | Dennehy, Jr. et al. | 414/478 X |
| 4,889,464 | 12/1989 | Self | 414/491 |
| 4,934,898 | 6/1990 | Galbreath | 414/478 X |
| 4,948,325 | 8/1990 | Hodgetts | 414/527 |
| 4,954,039 | 9/1990 | Johnston et al. | 414/500 |
| 5,088,875 | 2/1992 | Galbreath et al. | 414/478 |

OTHER PUBLICATIONS

Bobko Industries "Long Haul II" brochure, Apr. 12, 1991.

Primary Examiner—Michael S. Huppert
Assistant Examiner—James Keenan
Attorney, Agent, or Firm—Sperry, Zoda & Kane

[57] ABSTRACT

An apparatus for selectively positioning containers upon a trailer includes a main frame with a stationary upper frame and a pivotally movable hoisting frame. The pivotally movable frame is adapted to be movable between a lower position and a raised position to facilitate loading. A carriage is movable between the front portion of the movable hoisting frame and the stationary upper frame. This carriage controls movement of the containers upon and from the first container station on the stationary upper frame and the second container station on the movable hoisting frame. A primary winch is mounted with respect to the movable hoisting frame and includes a cable means extending about a sheave rotatably mounted on the carriage. An auxiliary movement device is positioned adjacent the front end of the vehicle body to facilitate movement of the container from the second station to the first station. The carriage is selectively movable between the front position and the rear position when a container is positioned upon the first container station to facilitate unloading of that container or to facilitate loading of a second container onto the second container receiving station. In this manner a single, fairly powerful primary winch device can be utilized for loading of two separate containers onto two separate locations longitudinally along the trailer. The use of only a single primary winch is achieved by the inclusion of a less powerful auxiliary movement device which may be a small winch, hydraulic cylinder or chain drive.

21 Claims, 4 Drawing Sheets

APPARATUS FOR LOADING AND UNLOADING OF TWO SEPARATE CONTAINERS UPON A VEHICULAR BODY

BACKGROUND OF THE INVENTION

1. Field Of The Invention

The present invention deals with the field of devices for handling of large containers with respect to vehicle bodies such as trailer bodies or truck bodies. The present invention deals more particularly with means for movement of these containers from one position to another position upon the body and for facilitating placement thereon and removal therefrom. More particularly the present invention deals with material handling devices for positioning of two containers upon a single vehicular trailer or truck body.

2. Description Of The Prior Art

Numerous prior art devices have been patented designed for the loading and unloading of containers with respect to trailer or truck bodies such as U.S. Pat. No. 2,699,735 patented Jan. 18, 1955 to E.T. Williams on a Transportation System; U.S. Pat. No. 2,741,383 patented Apr. 10, 1956 to J.T. Leckert and assigned to J. Leckert, A. Heath and R. Minton on a Self Unloading Vehicle; U.S. Pat. No. 2,831,588 patented Apr. 22, 1958 to W.H. Seed and assigned to Unibox Corporation on a Freightage Means; U.S. Pat. No. 3,130,847 patented Apr. 28, 1964 to G.R. Dempster et al and assigned to Dempster Brothers, Inc. on a Transporting Equipment For Containers; U.S. Pat. No. 4,092,755 patented Jun. 6, 1978 to G. Hughes on a Highly Versatile Dock Trailer; U.S. Pat. No. 4,514,131 patented Apr. 30, 1985 to J. Godwin on an Automatic Self-Locking Roll Back Carrier For A Vehicle; U.S. Pat. No. 4,599,040 patented Jul. 8, 1986 to R. Rasmussen and assigned to Accurate Industries, Inc. on a Method For Transporting Containers; U.S. Pat. No. 4,934,898 patented Jun. 19, 1990 to D. Galbreath and assigned to Galbreath Incorporated on a Roll-Off Hoist For Variable Positioning Of Containers And Method For Use Thereof; U.S. Pat. No. 4,948,325 patented Aug. 14, 1990 to G. Hodgetts and assigned to Rolflor Industries on a Control Apparatus For A Loading-Moving System and U.S. Pat. No. 5,088,875 patented Feb. 18, 1992 to D. Galbreath et al and assigned to Galbreath Incorporated on a Roll-Off Hoist For Variable Positioning Of Containers.

SUMMARY OF THE INVENTION

The present invention provides an apparatus for loading and unloading of separate containers upon a vehicular body such as a trailer or truck body which includes a main frame defining a front end and a rear end thereof. The main frame also includes a pivot point preferably adjacent the main frame rear end. A stationary upper frame is fixedly secured to the front portion of the main frame and defines a front end and rear end thereon. The stationary upper frame front end is positioned adjacent the main frame front end and the stationary upper frame means further defines a first container receiving station thereon. A movable hoisting frame is pivotally secured with respect to the main frame at the pivot point defined thereon preferably by a hinging device. The movable hoisting frame includes a movable hoisting frame front end and a movable hoisting frame rear end. The movable hoisting frame front end is positionable adjacent the stationary upper frame rear end of the stationary upper frame. The movable hoisting frame member defines a second container receiving station thereon. The movable hoisting frame is pivotally movable with respect to the main frame between a lower position and a raised position. The raised position facilitates loading and unloading of the container with respect to the second container receiving station.

A lifting device such as a pneumatically or hydraulically powered cylinder is attached to the main frame and to the movable hoisting frame. Preferably the lifting device includes a first end which is attached to the main frame and a second end which is attached to the movable hoisting frame. Both of these ends are preferably connected with some degree of pivotal movement therebetween. The lifting means is longitudinally extendable such as a telescoping cylinder to urge pivotal movement of the movable hoisting frame between the lowered position and the raised position thereof.

A carriage is also included movably attached with respect to the stationary upper frame and the first container receiving station defined thereon. The carriage is selectively attachable with respect to the movable hoisting frame front end such as to be selectively movable therewith between the lowered position and the raised position. The carriage is detachably securable with respect to the front end of the stationary upper frame means to facilitate movement thereof between the first container receiving station and the second container receiving station as desired. The carriage includes a carriage sheave rotatably secured thereto for receiving the primary cable. The carriage is movable between a front carriage position adjacent the stationary upper frame front end and a rear carriage position adjacent the movable frame front end. This movement is enhanced by inclusion of carriage wheel means or carriage skid block attached with respect to the carriage. The carriage is responsive to being located in the rear carriage position to facilitate movement of the container onto and off of the second container receiving station. The carriage is responsive to being moved toward the front carriage position by a cable, chain or piston to facilitate movement of a container onto the first carriage receiving station from the second carriage receiving station.

A primary winch or other movement means such a cylinder means can be positioned mounted preferably on the rear upper frame optionally at a position below the second container receiving station. The primary winch preferably includes a primary cable extendable outwardly therefrom. The primary cable is adapted to extend around the carriage sheave to be attachable to a container for facilitating loading and unloading thereof. The primary cable is attachable with respect to the carriage furthermore to urge movement thereof between the front carriage position and the rear carriage position as necessary.

An auxiliary movement means such as a secondary winch, chain or cylinder means may preferably be fixedly mounted to the stationary main frame front end and attached to the carriage. The auxiliary winch may include a cable means which is longitudinally extendable to urge movement of the carriage between the rear carriage position and the front carriage position and to urge movement of the container attached to the carriage between the second container receiving station and the first container receiving station. This auxiliary movement device may also include a cylinder or chain means if necessary but in any manner is not necessarily as powerful as the primary winch thereby effecting cost savings.

A carriage locking mechanism is adapted to detachably secure the carriage with respect to front end or the main frame means responsive to the carriage being in the front carriage position to allow operation of the primary winch and the primary cable to urge movement of the container from the second container receiving station to the first container receiving station.

Furthermore a carriage track is preferably secured to the main frame adjacent the first container receiving station and extends to a position adjacent the second container receiving station to facilitate movement of the carriage between the front carriage position and the rear carriage position. With a container positioned upon the first container receiving station, the carriage may be pulled to the rear carriage position adjacent the front end of the second container receiving station by either the primary or secondary winch means to facilitate loading of another container upon the first container receiving station thereby allowing loading of more than one container simultaneously upon the vehicle body.

It is an object of the present invention to provide an apparatus for loading and unloading of two separate containers upon a vehicle body wherein initial capital costs are minimized.

It is an object of the present invention to provide an apparatus for loading and unloading of two separate containers upon a vehicle body wherein maintenance expenses are minimized.

It is an object of the present invention to provide an apparatus for loading and unloading of two separate containers upon a vehicle body wherein maintenance down time is minimized.

It is an object of the present invention to provide an apparatus for loading and unloading of two separate containers upon a vehicle body wherein two containers can be loaded on two separate container receiving stations by operation of only a single powerful winch and a second smaller and less expensive auxiliary winch or movement means.

It is an object of the present invention to provide an apparatus for loading and unloading of two separate containers upon a vehicle body wherein two individual containers can be transported simultaneously with the ease of transporting only a single container.

It is an object of the present invention to provide an apparatus for loading and unloading of two separate containers upon a vehicle body wherein a carriage is movable between a front position and a rear position to facilitate movement of two containers with respect to two container mounting stations while simultaneously controlling usage of power by a smaller auxiliary positioning or movement device, and a larger more powerful movement device.

It is an object of the present invention to provide an apparatus for loading and unloading of two separate containers upon a vehicle body wherein a conventionally available extendable tail means can be used to facilitate loading of two containers with respect to two container receiving stations located on a single truck or trailer vehicle body.

It is an object of the present invention to provide an apparatus for loading and unloading of two separate containers upon a vehicle body wherein energy consumption is minimized.

It is an object of the present invention to provide an apparatus for loading and unloading of two separate containers upon a vehicle body wherein a container can be moved from one container receiving station to another container receiving station without requiring operation of two separate winch means.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
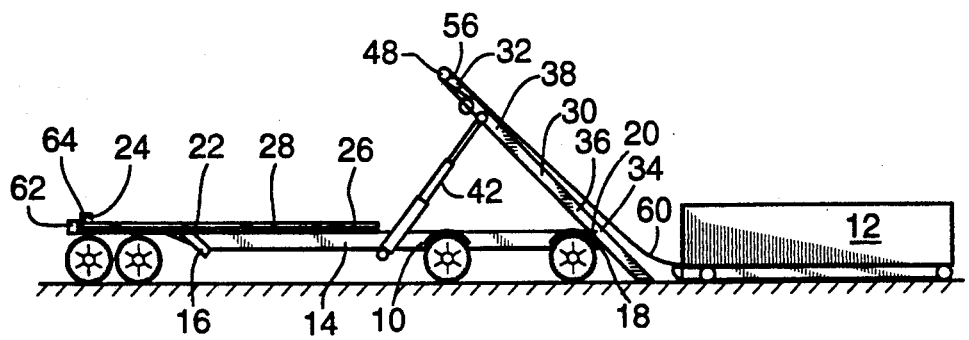
FIG. 1 is a side schematic illustration of an embodiment of the apparatus for loading and unloading of two separate containers upon a vehicle body of the present invention showing a container secured to the primary cable and about to be loaded onto the movable hoisting frame with the carriage located in the front of the hoisting frame.

The present invention provides an apparatus for loading and unloading of two separate containers 12 upon a vehicle body 10. This vehicle body 10 can be a trailer body or truck body.

The vehicular body 10 will include a main frame means 14 with a main frame front end 16 and a main frame rear end 18 defined for reference thereon. A movable hoisting frame 30 will be positioned adjacent the main frame rear end 18. This movable hoisting frame means 30 will preferably be pivotally secured with respect to pivot point 20 such as by positioning of a hinge at that location. Forwardly along the main frame 14 a stationary upper frame means 22 will be fixedly secured to the main frame front end 16. This stationary upper frame 22 will preferably include a stationary upper frame front end 24 and a stationary upper frame rear end 26 defined thereon for reference.

The stationary upper frame 22 will further define a first container receiving station 28 thereabove. The movable hoisting frame 30 preferably will include a movable hoisting frame front end 32 and a movable hoisting frame rear end 34. The movable hoisting frame rear end 34 will be positioned somewhat close to the pivot point 20.

Movable hoisting frame 30 will define a second container receiving station 36 thereon. Movable hoisting frame 30 will be movable between a raised position 38 and a lowered position 40. Raised position 38 will be utilized for loading and unloading of containers 12 with respect to the second container receiving station 36 and lowered position 40 will be used for transporting of containers with the vehicular body 10 or for transfer with respect to the first container receiving station 28.

A lifting means such as a telescoping pneumatically-powered hydraulic cylinder 42 will be hingedly secured at the first end 44 thereof preferably with respect to the main frame 14. Further preferably the second end 46 of lifting cylinder means 42 will be hingedly secured with respect to the movable hoisting frame 30. In this means the lifting means 42 will be operative by longitudinal extending thereof to effect movement of the movable hoisting frame means 30 between the raised position 38 and the lowered position 40 as required responsive to powering thereof.

A carriage means 48 is adapted to be movably mounted with respect to the stationary upper frame 22 and the front end of the movable hoisting frame means 30. The carriage means 48 is capable of being locked in place at the front end of the movable upper hoisting frame means 30. To facilitate this movement a carriage track means 66 may be positioned adjacent these locations below the position of the first container receiving station 28 and the second container receiving station 36. As such, the carriage 48 can be moved along the carriage track means 66 between the front carriage position 54 and the rear carriage position 56 (which is located adjacent the front of the hoisting frame) whether or not a container is positioned upon the first container receiving station 28 or the second container receiving station 36. It is the purpose of the carriage to control the powered movement means of the present invention and the positioning of the carriage greatly effects the control and distribution of this power. Therefore, it is quite important that the carriage 48 be movable between the front carriage position 54 and the rear carriage position 56 regardless of whether containers 12 are positioned upon the container receiving stations 28 and 36.

The carriage preferably includes a carriage sheave means 50 which preferably further includes a sheave groove 52 defined circumferentially therearound.

A primary winch means 58 is fixedly secured with respect to the movable hoisting frame means 30 and includes a primary cable means 60 extending thereout. This primary cable 60 is adapted to extend around the carriage sheave 50 preferably along and through the sheave groove 52. After passing around the carriage sheave 50 the primary cable 60 is selectively securable with respect to the carriage itself or with respect to a container for controlling movement of either of those members.

An auxiliary movement means 62 which preferably takes the form of a secondary winch means 68 and a secondary cable means 70 is positioned adjacent the front end 24 of the stationary upper frame 22. This secondary winch is adapted to facilitate movement of containers between the first container receiving station 28 and the second container receiving station 36 under low load conditions wherein the significant power of the primary winch means 58 is not needed.

The carriage means 48 is detachably securable in the front carriage position 54 immediately adjacent the auxiliary winch means 68 by usage of a carriage locking means 64.

Figure 19:
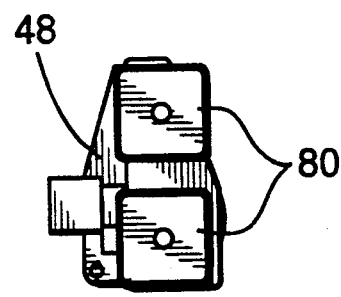
FIG. 19 is an alternative embodiment of the carriage of the present invention utilizing skid blocks instead of wheels.

Ease of movement of the carriage 48 between the front carriage position 54 and the rear carriage position 56 is an important aspect of the present invention and to facilitate this ease the carriage may include carriage wheel means 72 or skid blocks 80 adapted to be positioned within the carriage track means 66 to facilitate movement therealong. Carriage means 48 may alternatively includes carriage skid blocks 80 such as shown in FIG. 19. Skid blocks 80 can also be positioned within the carriage track means 66 to facilitate movement of carriage 48 between the front carriage position 54 and the rear carriage position 56.

The primary cable means 60 also preferably includes a primary cable attachment means 74 which is detachably securable with respect to the container to facilitate attachment thereto and is also detachably securable with respect to the carriage means itself to achieve movement thereof.

The present invention may optionally include an extendable tail means 76 which can be powered by a tail cylinder means 78 to vary the positioning of the tail especially during loading and unloading of the second container receiving station 36 responsive to the movable hoisting frame 30 being in the raised position 38. The tail cylinder means 78 is adapted to vary the extendable distance of the extendable tail means 76 as required in various circumstances. The extendible tail is not required and the apparatus of the present invention will operate fully without inclusion thereof.

An example of the full range of operation of the present invention is shown in the sequence of FIGS. 1 through 13. In FIG. 1 we see the container 12 positioned immediately behind the vehicular body 10 with the movable hoisting frame 30 positioned in the raised position 38. The primary winch means 58 has the primary cable means 60 thereof extending upwardly to the carriage means 48 which is positioned in the front end of the movable hoisting frame means 30. The cable extends around the rotatable carriage sheave 50, which is rotatably secured to the carriage means, and then moves downwardly along the upper surface of the movable hoisting frame 30 and into engagement with respect to the container 12.

Figure 2:
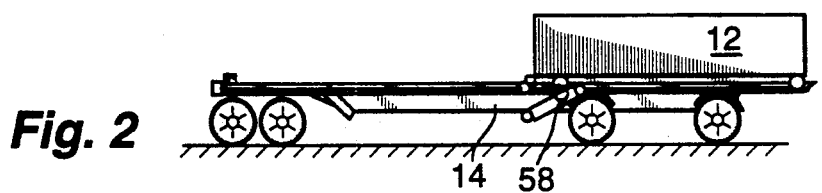
FIG. 2 is a side schematic illustration of an embodiment of the apparatus for loading and unloading of two separate containers upon a vehicle body of the present invention showing a container loaded upon the second container receiving station.
Figure 3:
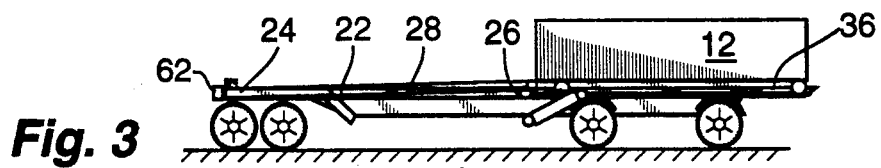
FIG. 3 is a side schematic illustration of an embodiment of the apparatus for loading and unloading of two separate containers upon a vehicle body of the present invention showing a container on the second container receiving station with the carriage moved to the front of the first container receiving station.

The primary winch means 58 will then be activated causing the primary cable means 60 to wind which will draw the container 12 upwardly onto the second container receiving station 36. Simultaneously the telescoping pneumatic or hydraulic lifting means 42 will move the movable hoisting frame 30 from the raised position 38 to the lowered position 40. This combination of movement will cause the container 12 to become positioned upon the second container receiving station 36 as shown in FIG. 2.

In order to allow positioning of an additional container upon this vehicular body 10 it is now necessary to move the container 12 from the second container receiving station 36 to the first container receiving station 28.

With an empty container or a partially or lightly loaded container, movement to the first container receiving station 28 can be achieved solely by power from the auxiliary movement means 62. Preferably this auxiliary movement means 62 will be a secondary and smaller winch means but it could be a cylinder or chain-drive configuration as currently available. A significant amount of power is available, if needed, in the primary winch means 58 to move the container onto the second container receiving station 36. Significantly less power is normally required for the sliding movement of the container 12 from the second container receiving station 36 to the first container receiving station 28.

Figure 4:
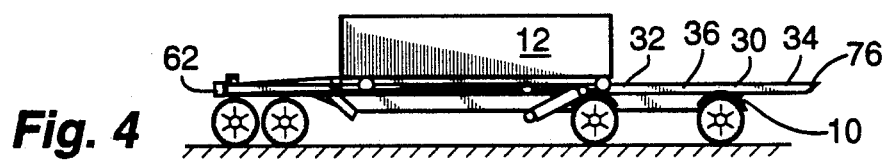
FIG. 4 is a side schematic illustration of an embodiment of the apparatus for loading and unloading of two separate containers upon a vehicle body of the present invention showing the container in the midst of movement between the second container receiving station and the first container receiving station being moved by the carriage and auxiliary winch, or with the carriage secured to the main frame and the container being moved by the primary winch.
Figure 5:
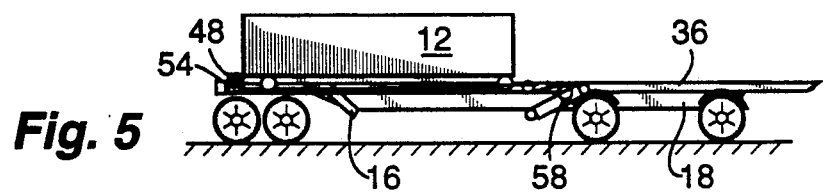
FIG. 5 is a side schematic illustration of an embodiment of the apparatus for loading and unloading of two separate containers upon a vehicle body of the present invention showing the container positioned in the second container receiving station.
Figure 6:
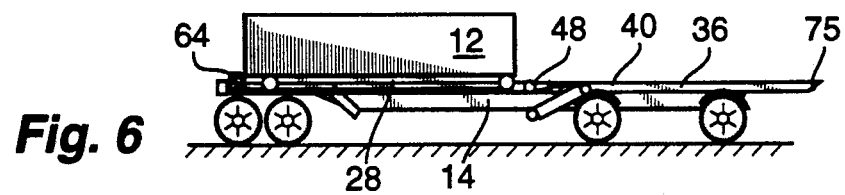
FIG. 6 is a side schematic illustration of an embodiment of the apparatus for loading and unloading of two separate containers upon a vehicle body of the present invention showing the container positioned in the first container receiving station with the carriage returned to the movable hoisting frame in the ready position to receive a second container.

Thus, activation of the primary winch means 58 will usually not be necessary except under conditions of very heavy loads being present in the container 12. The carriage means 48 can be locked in the front carriage position 48 or can be at an intermediate position between the container and the front carriage position at the time of operation of the primary winch means to move the container from the second container receiving station to the first container receiving station. Positioning of the carriage means prior to operation of the primary winch means can be controlled by the auxiliary winch means. Then the primary cable means 60, which is already attached with respect to the container 12, with the primary movement means 62 being activated, will wind-up thereby causing movement of the container 12 from the second container receiving station 36 toward the first container receiving station 28 as shown in FIG. 4. FIG. 5 shows this arrangement after the movement has been completed with the container 12 positioned in the first container receiving station 28.

With the configuration shown in FIG. 5 the container 12 is fully loaded with respect to the first container receiving station 28.

Figure 7:
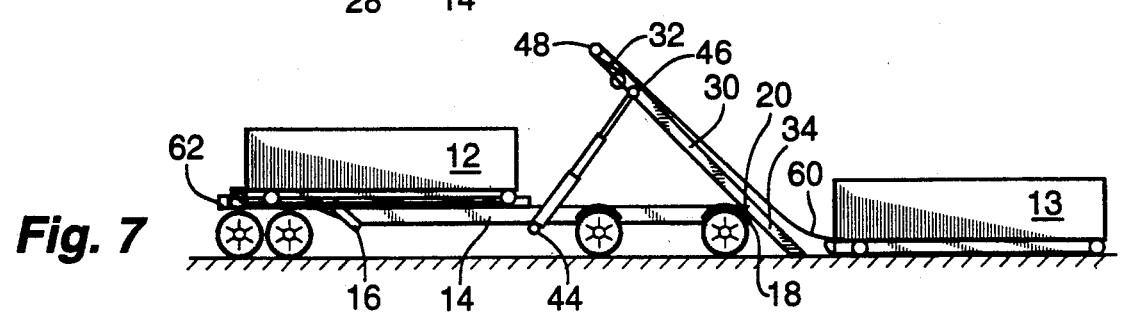
FIG. 7 is a side schematic illustration of an embodiment of the apparatus for loading and unloading of two separate containers upon a vehicle body of the present invention showing the movable hoisting frame in the raised position ready to receive a second container.
Figure 8:
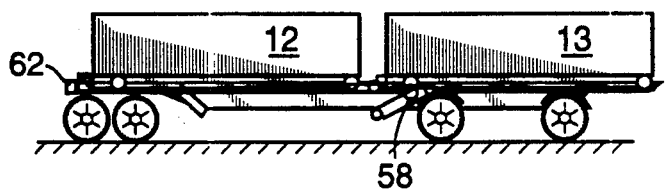
FIG. 8 is a side schematic illustration of an embodiment of the apparatus for loading and unloading of two separate containers upon a vehicle body of the present invention showing the second container positioned upon the second container receiving station.

In order to make preparation for the loading of a second container the primary cable means 60 is detached from the container 12 and is attached directly to the carriage 48. The carriage is unlocked and the primary winch means 58 is then activated to draw the carriage 48 with the secondary cable attached along the carriage track 66 below the first container receiving station means 28 until the carriage 48 reaches the rear carriage position 56 with the carriage 48 being engaged with respect to the front end 32 of the movable hoisting frame means 30. After disconnecting the secondary cable 70, the movable hoisting frame means 30 is in position to initiate loading of a second container 12. FIG. 7 shows the movable hoisting frame means 30 again moved to the raised position 38 with the carriage 48 at the front end 32 thereof and with the cable means 60 extending downwardly along the upper surface thereof and connected to the next container 13 to facilitate loading thereof. The primary winch 58 will be activated thereby drawing container 13 onto the second container receiving station 36 shown in FIG. 8. FIG. 8 is now the fully loaded position.

Figure 9:
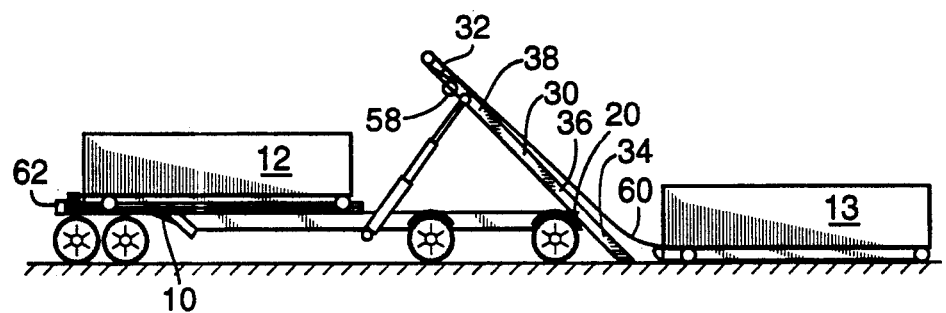
FIG. 9 is a side schematic illustration of an embodiment of the apparatus for loading and unloading of two separate containers upon a vehicle body of the present invention showing the second container removed from the second container receiving station with the movable hoisting frame in the raised position.
Figure 10:
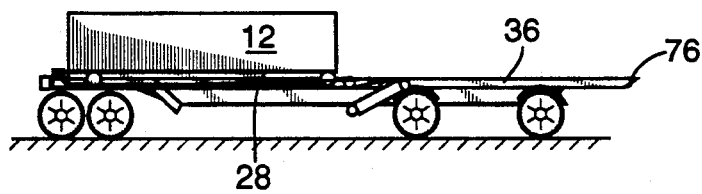
FIG. 10 is a side schematic illustration of an embodiment of the apparatus for loading and unloading of two separate containers upon a vehicle body of the present invention showing the movable hoisting frame after movement to the lowered position.
Figure 11:
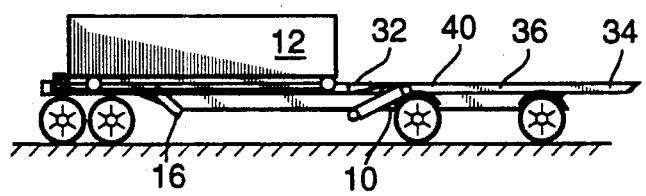
FIG. 11 is a side schematic illustration of an embodiment of the apparatus for loading and unloading of two separate containers upon a vehicle body of the present invention showing the carriage means returned to the front carriage position using the auxiliary winch.
Figure 12:
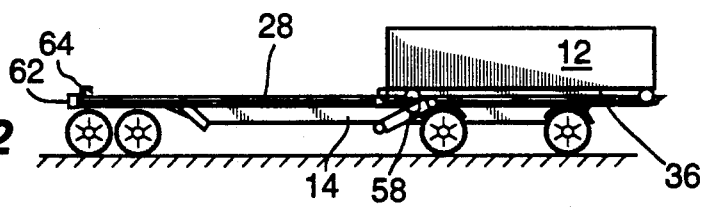
FIG. 12 is a side schematic illustration of an embodiment of the apparatus for loading and unloading of two separate containers upon a vehicle body of the present invention showing the container after movement from the first container receiving station to the second container receiving station by the carriage means with the primary winch.

To initiate unloading the lifting means 42 will be activated to cause movement of the movable hoisting frame 30 to the raised position 38 while the primary winch 58 is powered to unwind the primary cable means 60 allowing the container 13 to be unloaded rearwardly thereof as shown in FIG. 9. The secondary cable means 70 will then be attached with respect to the carriage and the secondary winch 68 will be activated to draw the carriage toward the front end 16 of the stationary frame. Immediately prior to powering of the secondary winch 68 the primary cable engagement means 74 will be attached directly with respect to the carriage now that container 13 has been unloaded. As such, movement to the position shown in FIG. 11 will be achieved with the carriage 48 located in the front carriage position 54 being powered to movement thereto by the secondary winch means 68 while the primary cable means 60 will still be attached to the carriage and the primary winch means 58 will be caused to unwind by the movement of the carriage 48 to the front carriage position 54. At this point the primary cable engagement means 74 will be attached with respect to the front of the container 12 which is located in the first container receiving station 28. As such, powering of movement of the primary winch means 58 will cause movement of the container 12 from the first container receiving station 28 to the second container receiving station 36. Simultaneously therewith the carriage 48 will be caused to move from the front carriage position 54 to the rear carriage position 56.

Figure 13:
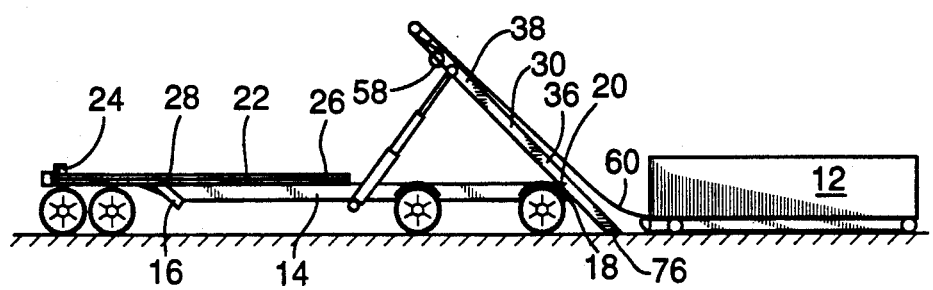
FIG. 13 is a side schematic illustration of an embodiment of the apparatus for loading and unloading of two separate containers upon a vehicle body of the present invention showing removal of the last container from the second container receiving station with the movable hoisting frame in the raised position.
Figure 15:
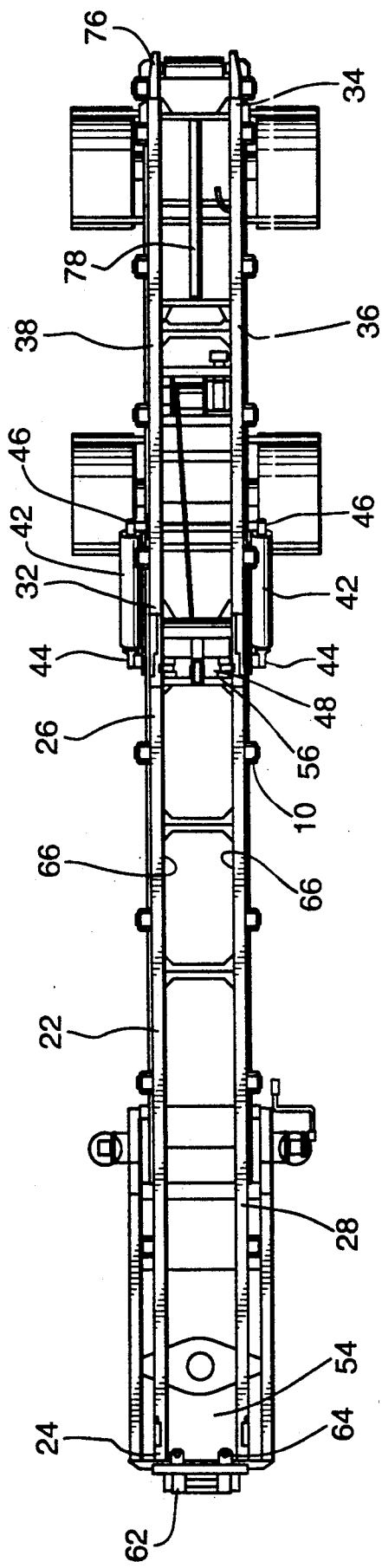
FIG. 15 is a top plan view of the embodiment shown in FIG. 14.
Figure 14:
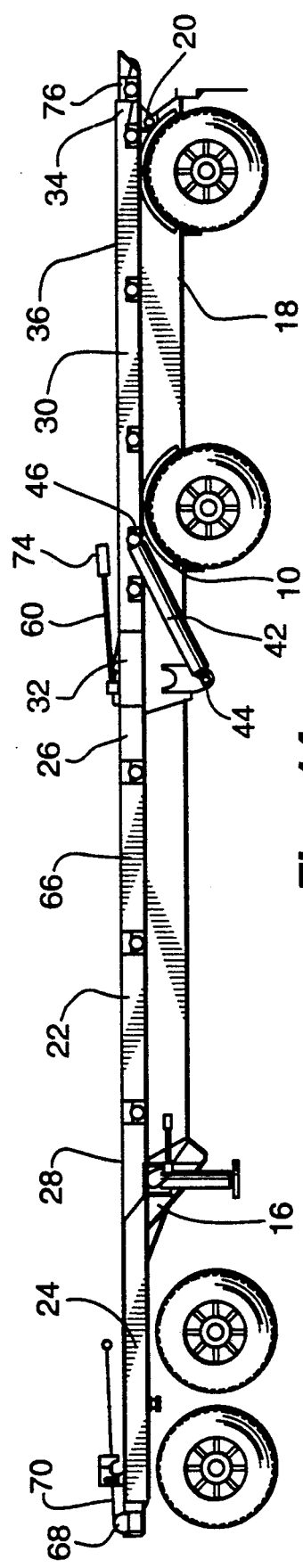
FIG. 14 is a side plan view of an embodiment of the apparatus for loading and unloading of two separate containers upon a vehicle body of the present invention.
Figure 16:
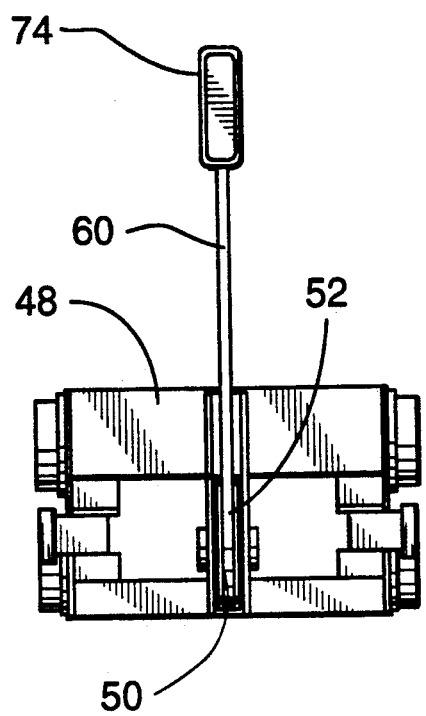
FIG. 16 is a top plan view of an embodiment of the carriage of the present invention.
Figure 17:
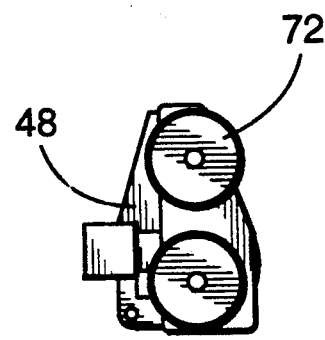
FIG. 17 is a side plan view of the embodiment shown in FIG. 16.
Figure 18:
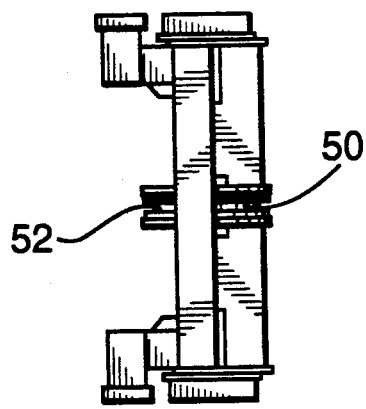
FIG. 18 is an end plan view of the embodiment of the carriage shown in FIG. 16.

After the secondary cable means 70 will be detached from the container 12 and the movable hoisting frame means 30 will be moved to the raised position 38 as shown in FIG. 13 thereby allowing the unloading of container 12 identically in the same manner as container 13 was unloaded.

Thus we see that the operation of the present invention allows complete control of movement of two separate containers by the utilization of a carriage mounted in a track movable below the two container receiving stations. This carriage movement capability eliminates the necessity for utilizing two fully powered primary winches and only requires a single primary winch 58 and a secondary or auxiliary winch 68 resulting in great savings in initial capital expense as well as weight and maintenance.

While particular embodiments of this invention have been shown in the drawings and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An apparatus for loading and unloading of two separate containers upon a vehicular body comprising:

A. a main frame means including a main frame front end means and a main frame rear end means, said main frame means defining a pivot point means thereon;

B. a stationary upper frame means fixedly secured to said main frame means to be stationary therewith, said stationary upper frame means defining a stationary upper frame front end means and a stationary upper frame rear end means, said stationary upper frame front end means being positioned adjacent said main frame front end means, said stationary upper frame means defining a first container receiving station means thereon;

C. a movable hoisting frame means pivotally secured with respect to said main frame means at said pivot point means defined thereon, said movable hoisting frame means including a movable hoisting frame front end means and a movable hoisting frame rear end means, said movable hoisting frame front end means being positionable adjacent said stationary upper frame rear end means of said stationary upper frame means, said movable hoisting frame means defining a second container receiving station means thereon, said movable hoisting frame means being pivotally moveable with respect to said main frame means between a lowered position and a raised position to facilitate loading and unloading of container with respect to said second container receiving station means;

D. a lifting means defining a first end means and a second end means thereon, said first end means being attached to said main frame means and said second end means being attached to said movable hoisting frame means, said lifting means being longitudinally extendible to urge pivotal movement of said movable hoisting frame means between the lowered position and the raised position thereof;

E. a carriage means being movably attached with respect to said stationary upper frame means and being selectively attachable with respect to said movable hoisting frame front end means to be selectively moveable therewith between the lowered position and the raised position thereof, said carriage means being movable to facilitate movement of a container to said first container receiving station means and said second container receiving station means, said carriage means including a carriage sheave means rotatably secured to said carriage means, said carriage means being movable between a front carriage position adjacent said stationary upper frame front end means and a rear carriage position adjacent said movable hoisting frame front end means, said carriage means being responsive to being located in the rear carriage position to facilitate movement of a container onto and off said second container receiving station means, said carriage means being responsive to being moved toward the front carriage position to facilitate movement of a container onto said first carriage receiving station means from said second carriage receiving station;

F. a primary winch means mounted on said rear upper frame means, said primary winch means including a primary cable means extending outwardly therefrom and being longitudinally moveable, said primary cable means being adapted to extend around said carriage sheave means to be attachable to a container for facilitating loading and unloading thereof, said primary cable means being attachable with respect to said carriage means to urge movement thereof between the front carriage position and the rear carriage position;

G. an auxiliary movement means fixedly mounted with respect to said main frame means and attachable to said carriage means, said auxiliary movement means being longitudinally extendible to urge movement of said carriage means between the rear carriage position and the front carriage position and to urge movement of a container attached to said carriage means between said second container receiving station means and said first container receiving station means;

H. carriage locking means adapted to detachably secure said carriage means to said stationary upper frame front end means responsive to said carriage means being in the front carriage position to allow operation of said primary winch means and primary cable means to urge movement of a container from said second container receiving station means to said first container receiving station means, said primary winch means being operable responsive to detachment of said carriage locking means to urge movement of a container positioned upon said first container receiving station means to said second container receiving station means; and I. a carriage track means secured to said stationary upper frame means below said first container receiving station means and secured to said movable hoisting frame front end means below said second container receiving station means to facilitate movement of said carriage means between the front carriage position and the rear carriage position with a container positioned upon said first container receiving station means to further facilitate movement of another container onto said second container receiving station means for loading of two separate containers simultaneously upon said first container receiving station means and said second container receiving station means.

2. An apparatus for loading and unloading of two separate containers upon a vehicular body as defined in claim 1 wherein said auxiliary movement means comprises a secondary winch means.

3. An apparatus for loading and unloading of two separate containers upon a vehicular body as defined in claim 2 wherein said secondary winch means includes a secondary cable means.

4. An apparatus for loading and unloading of two separate containers upon a vehicular body as defined in claim 1 wherein said pivot means is located adjacent said main frame rear end means.

5. An apparatus for loading and unloading of two separate containers upon a vehicular body as defined in claim 1 wherein said lifting means comprises a telescoping cylinder means.

6. An apparatus for loading and unloading of two separate containers upon a vehicular body as defined in claim 5 wherein said telescoping cylinder means includes an hydraulic cylinder.

7. An apparatus for loading and unloading of two separate containers upon a vehicular body as defined in claim 1 wherein said first end means of said lifting means is pivotally secured to said main frame means.

8. An apparatus for loading and unloading of two separate containers upon a vehicular body as defined in claim 1 wherein said second end means of said lifting means is pivotally secured to said movable hoisting frame means.

9. An apparatus for loading and unloading of two separate containers upon a vehicular body as defined in claim 1 wherein said second end means of said lifting means is secured to said movable hoisting frame means adjacent said movable hoisting frame front end means thereof.

10. An apparatus for loading and unloading of two separate containers upon a vehicular body as defined in claim 1 wherein said carriage means includes carriage wheel means positioned in said carriage track means to facilitate movement of said carriage means therealong.

11. An apparatus for loading and unloading of two separate containers upon a vehicular body as defined in claim 1 wherein said carriage means includes carriage skid blocks positioned in said carriage track means to facilitate movement of said carriage means therealong.

12. An apparatus for loading and unloading of two separate containers upon a vehicular body as defined in claim 1 wherein said primary cable means includes a primary cable engagement means selectively engageable with respect to said carriage means to facilitate movement thereof between said front carriage position and said rear carriage position.

13. An apparatus for loading and unloading of two separate containers upon a vehicular body as defined in claim 12 wherein said primary cable engagement means of said primary cable means is selectively engageable with respect to a container to urge movement thereof toward said carriage means responsive to operation of said primary winch means.

14. An apparatus for loading and unloading of two separate containers upon a vehicular body as defined in claim 1 further comprising a hinge means positioned at said pivot point means to facilitate pivotal movement of said movable hoisting frame means with respect to said main frame means.

15. An apparatus for loading and unloading of two separate containers upon a vehicular body as defined in claim 1 wherein said carriage sheave means defines a sheave groove extending peripherally and circumferentially therearound being adapted to receive said primary cable means extending therein.

16. An apparatus for loading and unloading of two separate containers upon a vehicular body as defined in claim 1 wherein said movable hoisting frame front end means is adapted to extend upwardly responsive to said movable hoisting frame means being in the raised position to facilitate movement of a container onto said second container receiving station.

17. An apparatus for loading and unloading of two separate containers upon a vehicular body as defined in claim 1 wherein said primary winch means is secured to said rear upper frame means at a position below said carriage track means to facilitate operation thereof for loading and unloading of containers with respect to said first container receiving station means and said second container receiving station means.

18. An apparatus for loading and unloading of two separate containers upon a vehicular body as defined in claim 1 wherein said auxiliary movement means is detachably secured with respect to said carriage means.

19. An apparatus for loading and unloading of two separate containers upon a vehicular body as defined in claim 1 further comprising an extendible tail means movably secured to said movable hoisting frame rear end means to facilitate movement of a container onto and off said second container receiving station means.

20. An apparatus for loading and unloading of two separate containers upon a vehicular body as defined in claim 19 further comprising a tail cylinder means attached with respect to said extendible tail means and said movable hoisting frame means to control positioning of said extendible tail means and facilitate movement of a container onto and off said second container receiving station means.

21. An apparatus for loading and unloading of two separate containers upon a vehicular body comprising:

A. a main frame means including a main frame front end means and a main frame rear end means, said main frame means defining a pivot point means thereon positioned adjacent said main frame rear end means;

B. a stationary upper frame means fixedly secured to said main frame means to be stationary therewith, said stationary upper frame means defining a stationary upper frame front end means and a stationary upper frame rear end means, said stationary upper frame front end means being positioned adjacent said main frame front end means, said stationary upper frame means defining a first container receiving station means thereon;

C. a movable hoisting frame means pivotally secured with respect to said main frame means at said pivot point means defined thereon, said movable hoisting frame means including a movable hoisting frame front end means and a movable hoisting frame rear end means, said movable hoisting frame front end means being positionable adjacent said stationary upper frame rear end means of said stationary upper frame means, said movable hoisting frame means defining a second container receiving station means thereon, said movable hoisting frame means being pivotally moveable with respect to said main frame means between a lowered position and a raised position to facilitate loading and unloading of a container with respect to said second container receiving station means, said movable hoisting frame front end means being moveable upwardly responsive to said movable hoisting frame means being moved to the raised position;

D. a lifting means defining a first end means and a second end means thereon, said lifting means comprising a telescoping cylinder means, said first end means being pivotally secured to said main frame means, said second end means being pivotally secured to said movable hoisting frame means adjacent said movable hoisting frame front end means thereof, said lifting means being longitudinally extendible to urge pivotal movement of said movable hoisting frame means between the lowered position and the raised position thereof;

E. a carriage means being movably attached with respect to said stationary upper frame means and being selectively attachable with respect to said movable hoisting frame front end means to be selectively moveable therewith between the lowered position and the raised position thereof, said carriage means being detachably securable to a container to facilitate movement thereof to said first container receiving station means and said second container receiving station means, said carriage means including a carriage sheave means rotatably secured to said carriage means, said carriage means being movable between a front carriage position adjacent said stationary upper frame front end means and a rear carriage position adjacent said movable hoisting frame front end means, said carriage means being responsive to being located in the rear carriage position to facilitate movement of a container onto and off said second container receiving station means, said carriage means being responsive to being moved toward the front carriage position to facilitate movement of a container onto said first carriage receiving station means from said second carriage receiving station, said carriage means including a carriage wheel means rotatably mounted thereon, said carriage sheave means defining a sheave groove means extending peripherally and circumferentially therearound;

F. a primary winch means mounted on said rear upper frame means, said primary winch means including a primary cable means extending outwardly therefrom and being longitudinally moveable, said primary cable means being adapted to extend around said carriage sheave means within said sheave groove means to be attachable to a container for facilitating loading and unloading thereof, said primary cable means being attachable with respect to said carriage means to urge movement thereof between the front carriage position and the rear carriage position, said primary cable means including a primary cable engagement means selectively engageable with respect to said carriage means to facilitate movement thereof between said front carriage position and said rear carriage position, said primary engagement means of said primary cable means being selectively engageable with respect to a container to urge movement thereof toward said carriage means responsive to operation of said primary winch means, said primary winch means being secured to said movable hoisting frame means at a position below said second container receiving station means to facilitate loading and unloading of containers with respect thereto;

G. an auxiliary movement means comprising a secondary winch means and a secondary cable means, said secondary winch means being fixedly mounted on said stationary upper frame front end means and detachably attached to said carriage means, said auxiliary movement means being longitudinally extendible to urge movement of said carriage means between the rear carriage position and the front carriage position and to urge movement of a container attached to said carriage means between said second container receiving station means and said first container receiving station means;

H. carriage locking means adapted to detachably secure said carriage means to said stationary upper frame front end means responsive to said carriage means being in the front carriage position to allow operation of said primary winch means and primary cable means to urge movement of a container from said second container receiving station means to said first container receiving station means, said primary winch means being operable responsive to detachment of said carriage locking means to urge movement of a container positioned upon said first container receiving station means to said second container receiving station means;

I. a carriage track means secured to said stationary upper frame means below said first container receiving station means and secured to said movable hoisting track front end means below said second container receiving station means, said carriage track means adapted to receive said carriage wheel means therein to facilitate movement of said carriage means between said front carriage position and said rear carriage position with a container positioned upon said first container receiving station means to further facilitate movement of another container onto said second container receiving station means for loading of two separate containers simultaneously upon said first container receiving station means and said second container receiving station means;

J. a hinge means positioned at said pivot point means to facilitate pivotal movement of said movable hoisting frame means with respect to said main frame means;

K. an extendible tail means movably secured to said movable hoisting frame rear end means to facilitate movement of a container onto and off said second container receiving station means; and L. a tail cylinder means attached with respect to said extendible tail means and said movable hoisting frame means to control positioning of said extendible tail means and facilitate movement of a container onto and off said second container receiving station means.

* * * * *